(12) United States Patent
Hata

(10) Patent No.: US 10,183,700 B2
(45) Date of Patent: Jan. 22, 2019

(54) VEHICLE LOWER PART STRUCTURE

(71) Applicant: TOYOTA JIDOSHA KABUSHIKI KAISHA, Toyota-shi (JP)

(72) Inventor: Koi Hata, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/798,691

(22) Filed: Oct. 31, 2017

(65) Prior Publication Data

US 2018/0134318 A1 May 17, 2018

(30) Foreign Application Priority Data

Nov. 15, 2016 (JP) .................................. 2016-222711

(51) Int. Cl.
| | | |
|---|---|---|
| B62D 25/02 | (2006.01) | |
| B62D 21/15 | (2006.01) | |
| B62D 21/02 | (2006.01) | |
| B62D 27/06 | (2006.01) | |
| B62D 25/20 | (2006.01) | |
| B62D 29/00 | (2006.01) | |

(52) U.S. Cl.
CPC ........... B62D 21/157 (2013.01); B62D 21/02 (2013.01); B62D 25/025 (2013.01); B62D 25/2036 (2013.01); B62D 27/065 (2013.01); B62D 29/008 (2013.01)

(58) Field of Classification Search
CPC .... B62D 21/157; B62D 21/02; B62D 25/025; B62D 25/2036; B62D 27/065; B62D 29/008

USPC ........ 296/209, 193.07, 205, 204, 63, 203.03
See application file for complete search history.

(56) References Cited

U.S. PATENT DOCUMENTS

| | | | | |
|---|---|---|---|---|
| 5,388,885 | A * | 2/1995 | Warren | ................ B62D 21/14 296/203.03 |
| 7,731,274 | B2 * | 6/2010 | Kishima | ................ B62D 27/04 296/203.03 |
| 2013/0026786 | A1 * | 1/2013 | Saeki | ................ B60K 1/04 296/187.12 |
| 2014/0327271 | A1 * | 11/2014 | Kishima | ............ B62D 25/2036 296/193.07 |
| 2015/0145288 | A1 * | 5/2015 | Kellner | ................ B62D 25/025 296/209 |

FOREIGN PATENT DOCUMENTS

| | | |
|---|---|---|
| JP | 6-227437 | 8/1994 |
| JP | 2004-359190 | 12/2004 |
| JP | 2008-195252 | 8/2008 |

* cited by examiner

*Primary Examiner* — Joseph D. Pape
(74) *Attorney, Agent, or Firm* — Oblon, McClelland, Maier & Neustadt, L.L.P.

(57) ABSTRACT

A vehicle lower part structure includes a side frame, a floor crossmember, a rectangular tubular rocker, and a connection member. The connection member is provided downward of the floor crossmember in a vehicle up-down direction between the side frame and the rocker, is in surface contact with and joined to each of a lower wall portion of the floor crossmember and a vertical wall portion on an inner side of the rocker in the vehicle-width direction, is formed of a single part into a rectangular tubular member, and has a vehicle front-rear direction as an axial direction of the connection member.

8 Claims, 2 Drawing Sheets

VEHICLE LOWER PART STRUCTURE

INCORPORATION BY REFERENCE

The disclosure of Japanese Patent Application No. 2016-222711 filed on Nov. 15, 2016 including the specification, drawings and abstract is incorporated herein by reference in its entirety.

BACKGROUND

1. Technical Field

The disclosure relates to a vehicle lower part structure.

2. Description of Related Art

Various structures of a vehicle lower part have been disclosed (see Japanese Unexamined Patent Application Publication No. 6-227437 (JP 6-227437 A), Japanese Unexamined Patent Application Publication No. 2008-195252 (JP 2008-195252 A), and Japanese Unexamined Patent Application Publication No. 2004-359190 (JP 2004-359190 A)). For example, JP 6-227437 A discloses a vehicle body structure in which a crossmember (floor crossmember) is disposed upward of a chassis frame in a vehicle up-down direction and a side sill (rocker) is disposed at a position lower than the chassis frame in the vehicle up-down direction. The vehicle body structure will be briefly described. The crossmember extends in a vehicle-width direction and supports a floor plate, and the side sill extends in a vehicle front-rear direction on a vehicle side part and is disposed at a position lower than the crossmember in the vehicle up-down direction. In addition, the outer end portions of the crossmember and the floor plate in the vehicle-width direction are bent to be inclined downward in the vehicle up-down direction and outward in the vehicle-width direction and are connected to the inner surface of the side sill in the vehicle-width direction. In the related art described above, stepped parts of the outer sides of the floor plate and the crossmember in the vehicle-width direction receive a load during a side collision.

SUMMARY

In the crossmember in the related art, the cross-sectional shape thereof perpendicular to the longitudinal direction of the crossmember is a hat shape. Members such as the crossmember are typically formed by press-forming a steel plate or the like, and using, for example, an extruded product as the crossmember is considered.

However, for example, in the crossmember formed of the extruded product, the cross-sectional shape thereof perpendicular to the longitudinal direction of the crossmember is constant and is formed into a linear shape. Therefore, bent portions like the outer end portion of the crossmember in the vehicle-width direction in the related art are not formed. Therefore, there is a need to firmly connect the crossmember to the side sill, the crossmember and the side sill being shifted from each other in the vehicle up-down direction, and exhibit energy absorption performance during a side collision while reducing the number of parts.

The disclosure provides a vehicle lower part structure capable of firmly connecting a floor crossmember to a rocker, the floor crossmember and the rocker being shifted from each other in a vehicle up-down direction, and exhibiting energy absorption performance during a side collision while reducing the number of parts.

An aspect relates to a vehicle lower part structure including a side frame, a floor crossmember, a rectangular tubular rocker, and a connection member. The side frame extends in a vehicle front-rear direction on a side of a vehicle body lower part. The floor crossmember is disposed upward of the side frame in a vehicle up-down direction, is formed of a single part into a rectangular tubular member which is a single part, and has an axis which extends along a vehicle-width direction. The rectangular tubular rocker is provided laterally outward of the side frame in the vehicle-width direction, and obliquely downward from an outer side of the floor crossmember in the vehicle-width direction, and the rectangular tubular rocker extends in the vehicle front-rear direction. The connection member is provided downward of the floor crossmember in the vehicle up-down direction between the side frame and the rectangular tubular rocker, the connection member is in surface contact with and joined to each of a lower wall portion of the floor crossmember and a vertical wall portion on an inner side of the rectangular tubular rocker in the vehicle-width direction, the connection member is formed of a rectangular tubular member which is a single part, and the connection member has an axis which extends along the vehicle front-rear direction.

According to the aspect, the connection member is provided downward of the floor crossmember in the vehicle up-down direction between the side frame and the rocker, and is in surface contact with and joined to each of the lower wall portion of the floor crossmember and the vertical wall portion on the inner side of the rocker in the vehicle-width direction. Therefore, the joint strength between the connection member and the floor crossmember and the joint strength between the connection member and the rocker are ensured. In addition, the connection member is formed as a rectangular tubular member and is disposed along the vehicle front-rear direction as its axial direction. Therefore, an impact load during a side collision is transmitted from the rocker to the side frame via the connection member and the rectangular tubular connection member is deformed such that energy during the side collision is absorbed. Furthermore, since the connection member is formed of a single part, the number of parts is reduced.

In the vehicle lower part structure according to the aspect, the connection member may have ribs that partition a hollow inside of the connection member.

According to the aspect, the ribs of the connection member are deformed due to the impact load during the side collision such that the energy during the side collision is effectively absorbed.

In the vehicle lower part structure according to the aspect, the connection member and the floor crossmember may be joined to each other by a first screw member and a second screw member. The first screw member may have a head portion disposed on a lower surface side of an upper wall portion of the connection member and penetrate through the upper wall portion of the connection member and the lower wall portion of the floor crossmember. The second screw member may have a head portion disposed on an upper surface side of an outer end portion of the lower wall portion of the floor crossmember in the vehicle-width direction and penetrate through the lower wall portion of the floor crossmember and the upper wall portion of the connection member.

According to the aspect, the connection member and the floor crossmember are joined to each other by the first screw member and the second screw member. The first screw member has the head portion disposed on the lower surface side of the upper wall portion of the connection member and penetrates through the upper wall portion of the connection member and the lower wall portion of the floor crossmember. On the other hand, the second screw member has the head portion disposed on the upper surface side of the lower wall portion of the floor crossmember and penetrates through the lower wall portion of the floor crossmember and the upper wall portion of the connection member. The upper wall portion of the connection member and the lower wall portion of the floor crossmember are portions that cannot be easily joined together by spot welding or the like performed between both sides. However, in the aspect, since the structure in which the upper wall portion and the lower wall portion are penetrated in the direction from each of the upper wall portion and the lower wall portion in the overlapping direction to be joined together is employed, the upper wall portion and the lower wall portion are firmly joined together. In addition, the floor crossmember has the open end at the outer end portion of the floor crossmember in the vehicle-width direction, the open end being inclined downward in the vehicle up-down direction and outward in the vehicle-width direction, and the second screw member described above penetrates through the outer end portion in the vehicle-width direction of the lower wall portion of the floor crossmember. Therefore, the lower wall portion of the floor crossmember can be easily penetrated by the second screw member from the upper surface side of the lower wall portion.

In the vehicle lower part structure according to the aspect, the floor crossmember may have an open end at an outer end portion of the floor crossmember in the vehicle-width direction. The open end may be inclined downward in the vehicle up-down direction and outward in the vehicle-width direction. The head portion of the second screw member may be positioned outward in the vehicle-width direction from an outer edge of an upper wall portion of the floor crossmember, and the outer edge defines the open end.

In the vehicle lower part structure according to the aspect, the upper wall portion of the floor crossmember may be provided with a seat attachment portion to which a vehicle seat is attached. The connection member and the floor crossmember may be jointed at a first portion positioned inward of the seat attachment portion in the vehicle-width direction and a second portion positioned outward of the seat attachment portion in the vehicle-width direction According to the aspect, since the connection member and the floor crossmember are jointed at the first portion positioned inward of the seat attachment portion in the vehicle-width direction and the second portion positioned outward of the seat attachment portion in the vehicle-width direction, the generation of a torque caused by the application of a load to the seat attachment portion from the vehicle seat is suppressed. Therefore, even when the load is applied to the seat attachment portion from the vehicle seat, the deformation of the floor crossmember and the connection member can be effectively suppressed.

In the vehicle lower part structure according to the aspect, the connection member may have a connection wall portion that connects a third portion in the connection member adjacent to a lower end portion side of a rectangular tubular portion of the rocker to a fourth portion positioned between the first portion and the second portion in the connection member. The connection wall portion may be disposed along a straight line connecting the third portion to the fourth portion in a front view of a vehicle.

According to the aspect, when the impact load is applied to the connection member from the rocker during a side collision, a portion of the impact load is transmitted to a portion between the first portion and the second portion in the overlapping parts of the floor crossmember and the connection member via the connection wall portion. Here, since the first portion and the second portion are portions that receive the load from the vehicle seat from above in the vehicle up-down direction, the portion between the first portion and the second portion in the overlapping parts of the floor crossmember and the connection member is less likely to be deformed even when a portion of the impact load is applied thereto during the side collision. Therefore, the impact load during the side collision can be appropriately transmitted.

In the vehicle lower part structure according to the aspect, the inner upper portion of the connection member in the vehicle-width direction may protrude upward in the vehicle up-down direction from the outer upper portion of the connection member in the vehicle-width direction. The inner upper portion of the connection member may be in contact with the lower wall portion of the floor crossmember.

According to the aspect, since the outer upper portion of the connection member in the vehicle-width direction is provided downward in the vehicle up-down direction of the inner upper portion of the connection member in the vehicle-width direction, a space for a harness or the like can be secured above the outer upper portion of the connection member in the vehicle-width direction.

In the vehicle lower part structure according to the aspect, the connection member may be a member extruded from an aluminum alloy.

As described above, with the vehicle lower part structure according to the aspect, the floor crossmember and the rocker which are shifted from each other in the vehicle up-down direction can be firmly connected and energy absorption performance can be exhibited during a side collision while reducing the number of parts.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A vehicle lower part structure according to an embodiment will be described with reference to FIGS. 1 and 2. The arrows FR, UP, IN appropriately shown in FIGS. 1 and 2 respectively indicate forward in a vehicle front-rear direction, upward in a vehicle up-down direction, and inward in a vehicle-width direction.

Configuration of Embodiment

Figure 1:
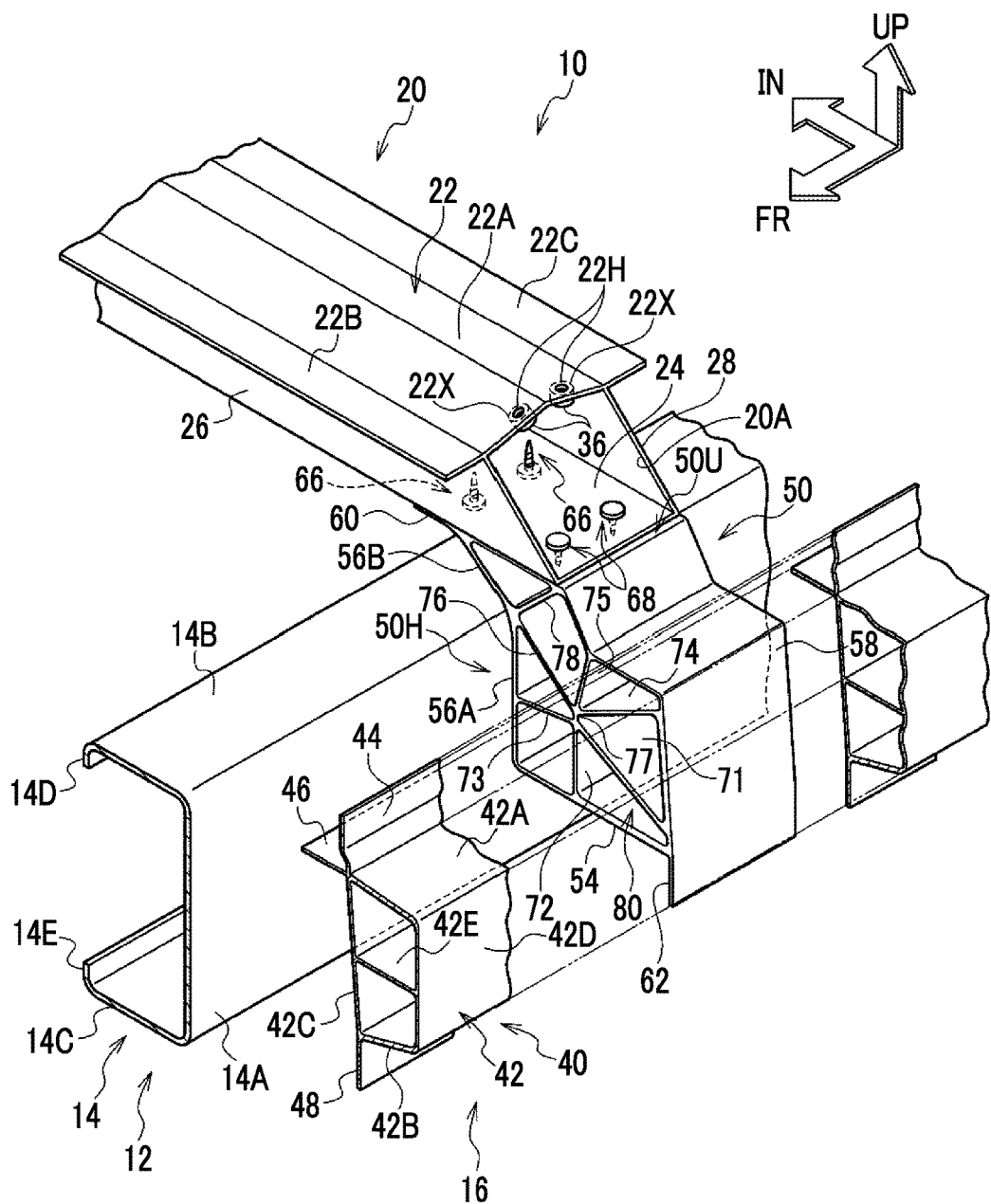
FIG. 1 is a perspective view illustrating a vehicle lower part structure according to an embodiment.
Figure 2:
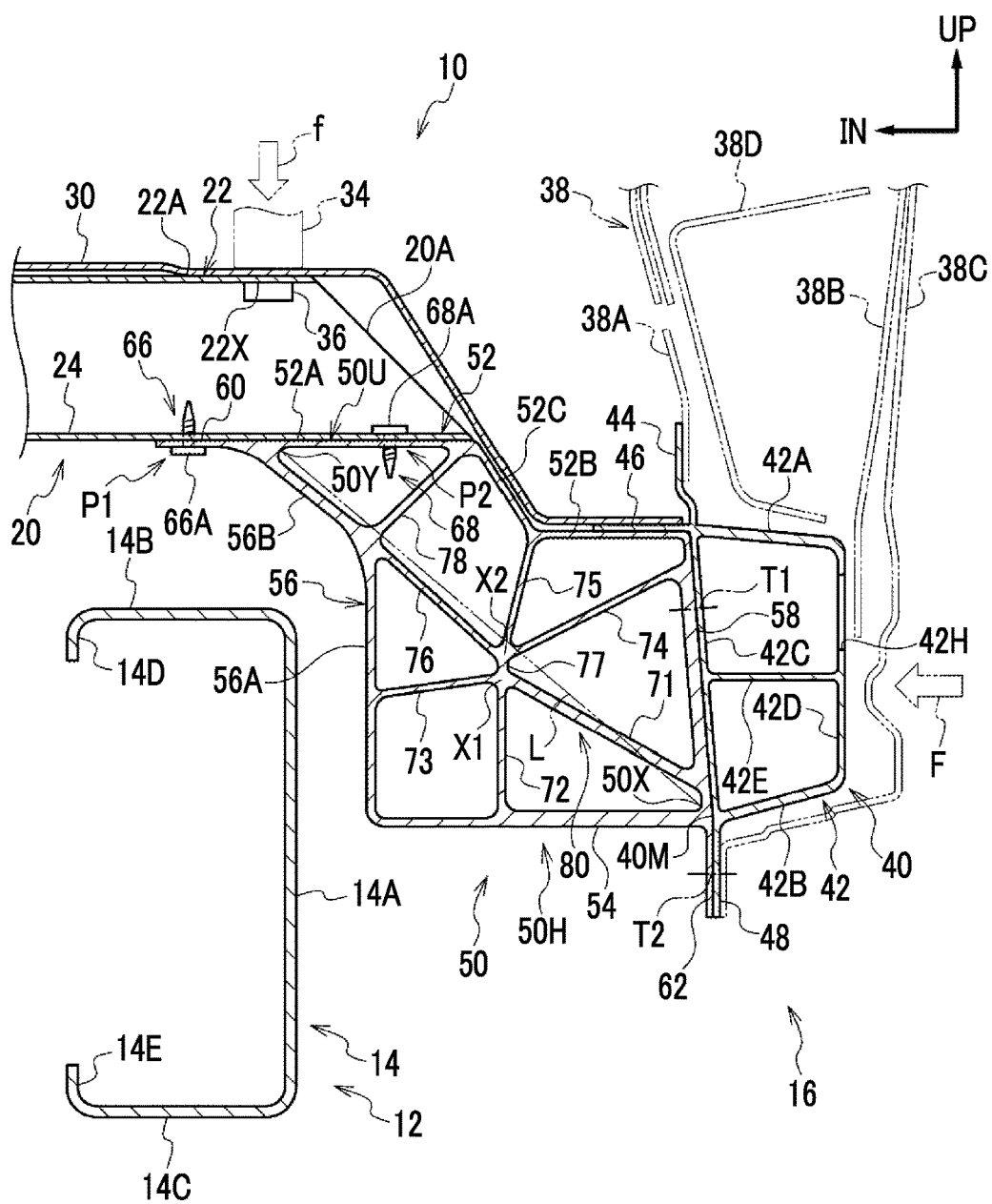
FIG. 2 is an enlarged sectional view of the vehicle lower part structure illustrated in FIG. 1 when the state of a floor crossmember and a gusset cut along a vehicle-width direction near the center in a vehicle front-rear direction is viewed in an enlarged front view of a vehicle.

FIG. 1 illustrates a perspective view of the vehicle lower part structure according to the embodiment, and FIG. 2 illustrates an enlarged sectional view of the vehicle lower part structure illustrated in FIG. 1 when the state of a floor crossmember 20 and a gusset 50 cut along the vehicle-width direction near the center in the vehicle front-rear direction is viewed in a front view of a vehicle. FIGS. 1 and 2 illustrate the configuration of the left side of the vehicle in the vehicle lower part structure according to the embodiment and illustration of the configuration of the right side of the vehicle is omitted. However, the configuration of the right side of the vehicle in the vehicle lower part structure according to the embodiment is bilaterally symmetrical to the configuration illustrated in FIGS. 1 and 2.

As illustrated in the figures, a vehicle body lower part 10 is provided with a chassis frame 12 configured to include a pair of right and left side frames 14. The chassis frame 12 includes the side frames 14 extending in the vehicle front-rear direction on both sides of the vehicle body lower part 10, and a plurality of crossmembers (not illustrated) bridged between predetermined portions of the side frames 14 in the vehicle front-rear direction. A body 16 is mounted on a plurality of points of the chassis frame 12 via body mounts (not illustrated).

The side frame 14 includes a vertical wall portion 14A forming the outer end portion of the side frame 14 in the vehicle-width direction, an upper wall portion 14B extending inward in the vehicle-width direction from the upper end of the vertical wall portion 14A, and a lower wall portion 14C extending inward in the vehicle-width direction from the lower end of the vertical wall portion 14A. An upper extension portion 14D that extends downward in the vehicle up-down direction from the inner end portion of the upper wall portion 14B in the vehicle-width direction is formed, and a lower extension portion 14E that extends upward in the vehicle up-down direction from the inner end portion of the lower wall portion 14C in the vehicle-width direction is formed.

The floor crossmember 20 is disposed upward of the side frame 14 in the vehicle up-down direction. The floor crossmember 20 is an extruded product formed of a single part from an aluminum alloy into a rectangular tubular hollow member and extends along the vehicle-width direction as its axial direction in the lower part of the body 16. Both longitudinal end portions of the floor crossmember 20 are disposed on both sides of the lower part of the body 16. As illustrated in FIG. 1, the floor crossmember 20 includes an upper wall portion 22 forming the upper end side of the floor crossmember 20, a lower wall portion 24 forming the lower end side of the floor crossmember 20, a front wall portion 26 having a vertical wall shape disposed closer to the front side of the vehicle, and a rear wall portion 28 having a vertical wall shape disposed closer to the rear side of the vehicle. In addition, the upper wall portion 22 includes an upper wall portion body 22A forming the intermediate portion of the upper wall portion in the vehicle front-rear direction. The upper wall portion body 22A, the front wall portion 26, the lower wall portion 24, and the rear wall portion 28 form a closed cross section. A front flange portion 22B extending forward in the vehicle front-rear direction from the front end of the upper wall portion body 22A is formed, and a rear flange portion 22C extending rearward in the vehicle front-rear direction from the rear end of the upper wall portion body 22A is formed. The front flange portion 22B and the rear flange portion 22C respectively form parts of the upper wall portion 22. The floor crossmember 20 has an open end 20A at the outer end portion of the floor crossmember 20 in the vehicle-width direction, the open end 20A being inclined downward in the vehicle up-down direction and outward in the vehicle-width direction.

As illustrated in FIG. 2, a floor panel 30 forming a vehicle body floor is joined to the upper side of the upper wall portion 22 of the floor crossmember 20 in the vehicle up-down direction. A vehicle seat 34 (in the figure, a constituent part of the lower end side of the vehicle seat 34 is schematically illustrated) is disposed on the floor panel 30. The outer end portion of the upper wall portion 22 of the floor crossmember 20 in the vehicle-width direction is provided with a pair of front and rear seat attachment portions 22X to which the vehicle seat 34 is attached. As illustrated in FIG. 1, the seat attachment portions 22X are arranged as a pair of the front and rear seat attachment portions 22X in the vehicle front-rear direction, and a bolt insertion hole 22H penetrates through each of the seat attachment portions 22X. A weld nut 36 is fixed to the periphery of the bolt insertion hole 22H on the lower surface side of the seat attachment portion 22X.

A rectangular tubular rocker 40 is provided laterally outward of the side frame 14 in the vehicle-width direction. The rocker 40 is a frame member that is disposed obliquely downward from the outer side of the floor crossmember 20 in the vehicle-width direction and extends in the vehicle front-rear direction, and forms a part of the body 16. In the embodiment, the rocker 40 is an extruded product formed of a single part from an aluminum alloy and includes a rocker body portion 42 as a rectangular tubular portion. The rocker body portion 42 includes an upper wall portion 42A forming the upper surface portion of the rocker body portion 42, a lower wall portion 42B forming the lower surface portion of the rocker body portion 42, an inner wall portion 42C as a vertical wall portion that connects the inner end portions of the upper wall portion 42A and the lower wall portion 42B in the vehicle-width direction, and an outer wall portion 42D having a vertical wall shape that connects the outer end portions of the upper wall portion 42A and the lower wall portion 42B in the vehicle-width direction. As an example, the lower end portion of a center pillar outer reinforcement 38B illustrated in FIG. 2 is disposed adjacent to the outer wall portion 42D of the rocker 40. In the section illustrated in FIG. 2, a hole 42H through which a rivet gun is inserted is formed in the upper portion of the outer wall portion 42D of the rocker 40 to penetrate therethrough. In addition, the rocker body portion 42 is provided with an intermediate wall portion 42E that connects the vertically intermediate portions of the inner wall portion 42C and the outer wall portion 42D in the vehicle up-down direction.

Furthermore, the rocker 40 includes an upper flange portion 44 extending upward in the vehicle up-down direction from the inner end portion of the upper end of the rocker body portion 42 in the vehicle-width direction, an inner flange portion 46 extending inward in the vehicle-width direction from the inner end portion of the upper end of the rocker body portion 42 in the vehicle-width direction, and a lower flange portion 48 as a vertical wall portion extending downward in the vehicle up-down direction from the inner end portion of the lower end of the rocker body portion 42 in the vehicle-width direction. The lower end portion of a center pillar inner panel 38A is joined to the upper flange portion 44, and the lower end portion of a center pillar outer panel 38C is joined to the lower flange portion 48. In addition, the center pillar inner panel 38A, the center pillar outer panel 38C, and the center pillar outer reinforcement 38B mentioned above constitute a center pillar 38. The center pillar 38 is a frame member extending in the vehicle up-down direction in the side part of the vehicle. A reinforcing member 38D is provided inside the center pillar 38.

The gusset 50 as a connection member is provided downward of the floor crossmember 20 in the vehicle up-down direction between the side frame 14 and the rocker 40. The gusset 50 is disposed such that a portion of the gusset 50 overlaps a portion of the side frame 14 in a side view of the vehicle (not illustrated). The gusset 50 is an extruded product formed of a single part from an aluminum alloy into a rectangular tubular hollow member and disposed along the vehicle front-rear direction as its axial direction. In other words, the axial direction of the gusset 50 is set to be perpendicular to the axial direction of the floor crossmember 20. The gusset 50 includes a hollow gusset body portion 50H, an inner flange portion 60 extending inward in the vehicle-width direction from the inner end portion of the upper end of the gusset body portion 50H in the vehicle-width direction, and a lower flange portion 62 extending downward in the vehicle up-down direction from the outer lower end portion of the gusset body portion 50H in the vehicle-width direction. The inner flange portion 60 forms a portion of an upper wall portion 50U of the gusset 50.

The gusset body portion 50H includes an upper wall body portion 52 that forms the upper surface portion of the gusset body portion 50H and has a stepped structure, a lower wall portion 54 forming the lower surface portion of the gusset body portion 50H, an inner wall portion 56 that connects the inner end portions of the upper wall body portion 52 and the lower wall portion 54 in the vehicle-width direction, and an outer wall portion 58 having a vertical wall shape that connects the outer end portions of the upper wall body portion 52 and the lower wall portion 54 in the vehicle-width direction. The upper wall body portion 52 forms a portion of the upper wall portion 50U of the gusset 50 and includes an upper wall first constituent portion 52A that forms the inner portion of the upper wall body portion 52 in the vehicle-width direction, and an upper wall second constituent portion 52B that forms the outer portion of the upper wall body portion 52 in the vehicle-width direction and is positioned downward of the upper wall first constituent portion 52A in the vehicle up-down direction. That is, the inner upper portion of the gusset 50 in the vehicle-width direction protrudes upward in the vehicle up-down direction from the outer upper portion of the gusset 50 in the vehicle-width direction. In addition, the amount of protrusion of the inner upper portion of the gusset 50 in the vehicle-width direction with respect to the outer upper portion of the gusset 50 in the vehicle-width direction is set according to the amount of offset between the upper wall portion 42A of the rocker 40 and the lower wall portion 24 of the floor crossmember 20 in the vehicle up-down direction.

The outer end portion of the upper wall first constituent portion 52A in the vehicle-width direction and the inner end portion of the upper wall second constituent portion 52B in the vehicle-width direction are connected by an upper wall inclination portion 52C. The upper wall inclination portion 52C is inclined downward in the vehicle up-down direction and outward in the vehicle-width direction. In addition, the outer portion of the floor panel 30 in the vehicle-width direction is disposed along the open end 20A of the floor crossmember 20 and the upper wall inclination portion 52C and the upper wall second constituent portion 52B of the gusset 50. On the other hand, the inner wall portion 56 includes an inner vertical wall portion 56A disposed to face the outer wall portion 58 and an inner inclination wall portion 56B inclined upward in the vehicle up-down direction and inward in the vehicle-width direction from the upper end of the inner vertical wall portion 56A. The inner inclination wall portion 56B is disposed substantially parallel to the upper wall inclination portion 52C.

The gusset 50 is in surface contact with an inner surface 40M of the rocker 40 in the vehicle-width direction and is joined to the rocker 40. More specifically, the outer wall portion 58 of the gusset 50 is in surface contact with the inner wall portion 42C of the rocker 40 and is joined thereto by a rivet (the fastening line is indicated by the dash-dotted line T1), and the lower flange portion 62 is in surface contact with the lower flange portion 48 of the rocker 40 and is joined thereto by a rivet (the fastening line is indicated by the dash-dotted line T2). On the upper wall second constituent portion 52B of the gusset 50, the inner flange portion 46 of the rocker 40 and the outer end portion of the floor panel 30 in the vehicle-width direction sequentially overlap.

Furthermore, in the inner upper portion of the gusset 50 in the vehicle-width direction, the inner flange portion 60 and the upper wall first constituent portion 52A are joined to the lower wall portion 24 in a state of being in surface contact with a lower surface of the lower wall portion 24 of the floor crossmember 20. The gusset 50 and the floor crossmember 20 are joined to each other by a pair of front and rear first screw members 66 and a pair of front and rear second screw members 68. As illustrated in FIG. 1, the first screw members 66 are arranged as a pair of the front and rear first screw members 66 in the vehicle front-rear direction, and the second screw members 68 are also arranged as a pair of the front and rear second screw members 68 in the vehicle front-rear direction. As illustrated in FIG. 2, the joint portions between the gusset 50 and the floor crossmember 20 are set to a first portion P1 positioned inward of the seat attachment portion 22X in the vehicle-width direction and a second portion P2 positioned outward of the seat attachment portion 22X in the vehicle-width direction.

The first screw member 66 used in the first portion P1 has a head portion 66A disposed on the lower surface side of the inner flange portion 60 (a portion of the upper wall portion 50U) of the gusset 50 and penetrates through the inner flange portion 60 of the gusset 50 and the lower wall portion 24 of the floor crossmember 20. On the other hand, the second screw member 68 used in the second portion P2 has a head portion 68A disposed on the upper surface side of the outer end portion of the lower wall portion 24 of the floor crossmember 20 in the vehicle-width direction and penetrates through the lower wall portion 24 of the floor crossmember 20 and the upper wall first constituent portion 52A (a portion of the upper wall portion 50U) of the gusset 50.

More specifically, joining between the gusset 50 and the floor crossmember 20 is performed by pressing the first screw members 66 and the second screw members 68 into the gusset 50 and the floor crossmember 20 while rotating the first screw members 66 and the second screw members 68 at a high speed to cause the gusset 50 and the floor crossmember 20 as the base metal to be melted by frictional heat and fused together (so-called Flow Drill Screw (FDS) (registered trademark)). In addition, during the joining between the gusset 50 and the floor crossmember 20, the first screw members 66 are pressed from the lower surface side of the inner flange portion 60 of the gusset 50 toward the floor crossmember 20 side, and the second screw members 68 are pressed from the upper surface side of the lower wall portion 24 of the floor crossmember 20 toward the gusset 50 side.

In the gusset 50, a plurality of (in the embodiment, eight) ribs 71, 72, 73, 74, 75, 76, 77, 78 (hereinafter, abbreviated to "ribs 71 to 78") is formed to partition the hollow inside of the gusset 50.

The rib 72 provided at the intermediate portion in the vehicle-width direction of the lower portion of the gusset 50 extends upward in the vehicle up-down direction from the intermediate portion of the lower wall portion 54 of the gusset 50 in the vehicle-width direction to a center first position X1 which is a position substantially at the same height as that of the center portion of the outer wall portion 58 in the vehicle up-down direction. The rib 71 provided on the outer side in the vehicle-width direction of the lower portion of the gusset 50 is inclined upward in the vehicle up-down direction and inward in the vehicle-width direction from the lower end portion side of the outer wall portion 58 (more specifically, a position slightly higher than the point of intersection of the outer wall portion 58 and the lower wall portion 54), and extends to the center first position X1. The rib 73 provided on the inner side in the vehicle-width direction of the lower portion of the gusset 50 is slightly inclined upward in the vehicle up-down direction and outward in the vehicle-width direction from the intermediate portion of the inner vertical wall portion 56A in the vehicle up-down direction, and extends to the center first position X1.

The rib 75 provided at the intermediate portion in the vehicle-width direction of the upper portion of the gusset 50 is slightly inclined downward in the vehicle up-down direction and inward in the vehicle-width direction from the point of intersection of the upper wall second constituent portion 52B and the upper wall inclination portion 52C, and extends to a center second position X2 at a position slightly higher than the center first position X1 The rib 74 provided on the outer side in the vehicle-width direction of the upper portion of the gusset 50 is inclined downward in the vehicle up-down direction and inward in the vehicle-width direction from the upper end portion side of the outer wall portion 58 (more specifically, a position slightly lower than the point of intersection between the outer wall portion 58 and the upper wall second constituent portion 52B), and extends to the center second position X2. The rib 76 provided on the inner side in the vehicle-width direction of the upper portion of the gusset 50 is inclined downward in the vehicle up-down direction and outward in the vehicle-width direction from the point of intersection of the inner vertical wall portion 56A and the inner inclination wall portion 56B, and extends to the center second position X2.

The center first position X1 and the center second position X2 are connected in the vehicle up-down direction by the rib 77 used for connection. The point of intersection between the inner vertical wall portion 56A and the inner inclination wall portion 56B, and the point of intersection between the upper wall first constituent portion 52A and the upper wall inclination portion 52C are connected by the rib 78. Furthermore, the ribs 71, 77, 76 and the inner inclination wall portion 56B constitute a connection wall portion 80 that connects a third portion 50X in the gusset 50 adjacent to the lower end portion side of the rocker body portion 42 of the rocker 40 to a fourth portion 50Y positioned between the first portion P1 and the second portion P2 in the gusset 50. The connection wall portion 80 is disposed along a straight line L connecting the third portion 50X to the fourth portion 5OY in the front view of the vehicle.

A portion of the lower wall portion 54 positioned outward of the rib 72 in the vehicle-width direction, a portion of the outer wall portion 58 between the point of intersection between the outer wall portion 58 and the rib 71 and the point of intersection between the outer wall portion 58 and the rib 74, the rib 71, and the inner inclination wall portion 56B are set to have greater plate thicknesses than the other portions of the gusset 50.

Operation and Effect of Embodiment

Next, the operation and effect of the embodiment will be described.

With the above-described configuration, the gusset 50 is provided downward of the floor crossmember 20 in the vehicle up-down direction between the side frame 14 and the rocker 40, is in surface contact with and joined to the lower wall portion 24 of the floor crossmember 20, and is in surface contact with and joined to the inner wall portion 42C and the lower flange portion 48 of the rocker 40. Therefore, the joint strength between the gusset 50 and the floor crossmember 20, and the joint strength between the gusset 50 and the rocker 40 are ensured. In addition, the gusset 50 is formed as the rectangular tubular member and is disposed along the vehicle front-rear direction as its axial direction. Therefore, an impact load F during a side collision is transmitted from the rocker 40 to the side frame 14 via the gusset 50 and the rectangular tubular gusset 50 is deformed such that energy during the side collision is absorbed. Furthermore, since the gusset 50 is formed of a single part, the number of parts is reduced.

In addition, since the ribs 71 to 78 that partition the hollow inside of the gusset 50 are formed in the gusset 50, the ribs 71 to 78 of the gusset 50 are deformed due to the impact load F during the side collision such that the energy during the side collision is effectively absorbed.

In addition, the gusset 50 and the floor crossmember 20 are joined together by the first screw members 66 and the second screw members 68. The first screw member 66 has the head portion 66A disposed on the lower surface side of the inner flange portion 60 (a portion of the upper wall portion 50U) of the gusset 50 and penetrates through the inner flange portion 60 of the gusset 50 and the lower wall portion 24 of the floor crossmember 20. On the other hand, the second screw member 68 has the head portion 68A disposed on the upper surface side of the outer end portion of the lower wall portion 24 of the floor crossmember 20 in the vehicle-width direction and penetrates through the lower wall portion 24 of the floor crossmember 20 and the upper wall first constituent portion 52A (a portion of the upper wall portion 50U) of the gusset 50. The upper wall portion 50U of the gusset 50 and the lower wall portion 24 of the floor crossmember 20 are portions that cannot be easily joined together by spot welding or the like performed between both sides. However, in the embodiment, since the structure in which the upper wall portion 50U and the lower wall portion 24 are penetrated in the direction from each of the upper wall portion 50U and the lower wall portion 24 in the overlapping direction to be joined together is employed, the upper wall portion 50U and the lower wall portion 24 are firmly joined together.

In addition, the floor crossmember 20 has the open end 20A at the outer end portion of the floor crossmember 20 in the vehicle-width direction, the open end 20A being inclined downward in the vehicle up-down direction and outward in the vehicle-width direction, and the second screw members 68 described above penetrate through the outer end portion in the vehicle-width direction of the lower wall portion 24 of the floor crossmember 20. Therefore, when the lower wall portion 24 of the floor crossmember 20 and the upper wall first constituent portion 52A of the gusset 50 are joined together by the second screw members 68, the lower wall portion 24 of the floor crossmember 20 can be easily penetrated by the second screw members 68 from the upper surface side of the lower wall portion 24.

In the embodiment, the joint portions between the gusset 50 and the floor crossmember 20 are set to the first portion P1 positioned inward of the seat attachment portion 22X in the vehicle-width direction and the second portion P2 positioned outward of the seat attachment portion 22X in the vehicle-width direction. Accordingly, the generation of a torque caused by the application of a load f to the seat attachment portion 22X from the vehicle seat 34 is suppressed. Therefore, even when the load f is applied to the seat attachment portion 22X from the vehicle seat 34, the deformation of the floor crossmember 20 and the gusset 50 can be effectively suppressed.

In addition, in the embodiment, the gusset 50 includes the connection wall portion 80 (the ribs 71, 77, 76 and the inner inclination wall portion 56B) that connects the third portion 50X in the gusset 50, adjacent to the lower end portion side of the rocker body portion 42 of the rocker 40, to the fourth portion 50Y positioned between the first portion P1 and the second portion P2 in the gusset 50 in the front view of the vehicle, and is disposed along the straight line connecting the third portion 50X to the fourth portion 50Y in the front view of the vehicle. Therefore, in a case where the impact load F is applied to the gusset 50 from the rocker 40 during a side collision, a portion of the impact load F is transmitted to a portion between the first portion P1 and the second portion P2 in the overlapping parts of the floor crossmember 20 and the gusset 50 via the connection wall portion 80. Here, since the first portion P1 and the second portion P2 are portions that receive the load f from the vehicle seat 34 from above in the vehicle up-down direction, the portion between the first portion P1 and the second portion P2 in the overlapping parts of the floor crossmember 20 and the gusset 50 is less likely to be deformed even when a portion of the impact load F is applied thereto during the side collision. Therefore, the impact load F during the side collision can be appropriately transmitted.

As described above, with the vehicle lower part structure of the embodiment, the floor crossmember 20 and the rocker 40 which are shifted from each other in the vehicle up-down direction can be firmly connected to each other and the energy absorption performance can be exhibited during the side collision with a reduced number of parts. In addition, in the embodiment, since the extruded product formed from the aluminum alloy is applied to the floor crossmember 20, the rocker 40, and the gusset 50, a reduction in weight can be achieved.

In addition, in the embodiment, since the outer upper portion of the gusset 50 in the vehicle-width direction is provided downward in the vehicle up-down direction of the inner upper portion of the gusset 50 in the vehicle-width direction, a space for a harness or the like can be secured above the outer upper portion of the gusset 50 in the vehicle-width direction.

Supplemental Description of Embodiment

In the embodiment, although the ribs 71 to 78 that partition the hollow inside of the gusset 50 are formed in the gusset 50, a configuration in which no rib is formed in the gusset (connection member) may also be employed. On the other hand, in a case where ribs that partition the hollow inside of the gusset are formed in the gusset (connection member), the amount of energy absorbed during a side collision can be tuned or a timing at which the amount of absorbed energy is increased and the like can be tuned by changing the settings of the ribs. In other words, deformation modes can be controlled by appropriately setting the ribs.

In the embodiment, the gusset 50 and the floor crossmember 20 are joined together by the first screw members 66 and the second screw members 68. However, the gusset (connection member) and the floor crossmember may also be joined together by well-known rivets or the like.

In the embodiment, the joint portions between the gusset 50 and the floor crossmember 20 are set to the first portion P1 and the second portion P2. Although the above-described configuration is preferable, for example, a configuration in which the joint portion between the gusset (connection member) and the floor crossmember is set to a portion immediately below the seat attachment portion 22X instead of one of the first portion P1 and the second portion P2 may also be employed.

In addition, in the embodiment, although the gusset 50 includes the connection wall portion 80 that connects the third portion 50X to the fourth portion 50Y and is disposed along the straight line L connecting the third portion 50X to the fourth portion 50Y, a configuration without the connection wall portion 80 may also be employed.

In the embodiment, although the inner upper portion of the gusset 50 in the vehicle-width direction protrudes upward in the vehicle up-down direction from the outer upper portion of the gusset 50 in the vehicle-width direction and is in contact with the lower wall portion 24 of the floor crossmember 20, the upper surface of the upper portion of the connection member may also be set to be flat.

In the embodiment, although the rocker 40 is formed of a single part, the rocker may also be formed of a plurality of parts including an inner panel and an outer panel.

The embodiment and a plurality of modification examples described above can be appropriately combined to be implemented.

While an example has been described above, the aspect is not limited to the above description, and it is natural that various modifications other than the above-described example can be made without departing from the gist of the disclosure.

What is claimed is:

1. A vehicle lower part structure comprising:
   a side frame extending in a vehicle front-rear direction on a side of a vehicle body lower part;
   a floor crossmember disposed upward of the side frame in a vehicle up-down direction, the floor crossmember being formed of a first rectangular tubular member which is a single part, and the floor crossmember having an axis which extends along a vehicle-width direction;
   a rectangular tubular rocker that is disposed laterally outward of the side frame in the vehicle-width direction and obliquely downward from an outer side of the floor crossmember in the vehicle-width direction, and the rectangular tubular rocker extending in the vehicle front-rear direction; and
   a connection member that is provided downward of the floor crossmember in the vehicle up-down direction between the side frame and the rectangular tubular rocker, the connection member being in surface contact with and joined to each of a lower wall portion of the floor crossmember and a vertical wall portion on an inner side of the rectangular tubular rocker in the vehicle-width direction, the connection member being formed of a second rectangular tubular member which is a single part, and the connection member having a connection member axis which extends along the vehicle front-rear direction.

2. The vehicle lower part structure according to claim 1, wherein the connection member has ribs that partition a hollow inside of the connection member.

3. The vehicle lower part structure according to claim 1, wherein the connection member and the floor crossmember are joined to each other by a first screw member and a second screw member, the first screw member having a first head portion disposed on a lower surface side of an upper wall portion of the connection member and penetrating through the upper wall portion of the connection member and the lower wall portion of the floor crossmember, and the second screw member having a second head portion disposed on an upper surface side of an outer end portion of the lower wall portion of the floor crossmember in the vehicle-width direction and penetrating through the lower wall portion of the floor crossmember and the upper wall portion of the connection member.

4. The vehicle lower part structure according to claim 3, wherein:
- the floor crossmember has an open end at an outer end portion of the floor crossmember in the vehicle-width direction, the open end being inclined downward in the vehicle up-down direction and outward in the vehicle-width direction; and
- the head portion of the second screw member is positioned outward in the vehicle-width direction from an outer edge of an upper wall portion of the floor crossmember, and the outer edge defines the open end.

5. The vehicle lower part structure according to claim 1, wherein:
- an upper wall portion of the floor crossmember is provided with a seat attachment portion to which a vehicle seat is attached; and
- the connection member and the floor crossmember are jointed at a first portion positioned inward of the seat attachment portion in the vehicle-width direction and a second portion positioned outward of the seat attachment portion in the vehicle-width direction.

6. The vehicle lower part structure according to claim 5, wherein the connection member has a connection wall portion that connects a third portion in the connection member adjacent to a lower end portion side of a rectangular tubular portion of the rocker to a fourth portion positioned between the first portion and the second portion in the connection member, and the connection wall portion is disposed along a straight line connecting the third portion to the fourth portion in a front view of a vehicle.

7. The vehicle lower part structure according to claim 1, wherein an inner upper portion of the connection member in the vehicle-width direction protrudes upward in the vehicle up-down direction from an outer upper portion of the connection member in the vehicle-width direction, and the inner upper portion of the connection member is in contact with the lower wall portion of the floor crossmember.

8. The vehicle lower part structure according to claim 1, wherein the connection member is a member extruded from an aluminum alloy.

* * * * *